Patented Dec. 7, 1943

2,336,437

UNITED STATES PATENT OFFICE 2,336,437

FROTH FLOTATION OF ACIDIC MINERALS

Stephen Edward Erickson, Springdale, Conn., assignor to American Cyanamid Company, New York, N. Y., a corporation of Maine No Drawing. Application September 13, 1940, Serial No. 356,651

7 Claims. (Cl. 209—166)

The present invention relates to mineral concentration. More particularly it relates to a new class of reagents for selectively separating acidic minerals from ore materials.

In accordance with this invention natural ores or artificial materials comprising mixtures of acidic minerals with other mineral constituents are subjected to a separation or concentration process in the presence of a promoter, said promoter being the condensation products obtained by reacting a monoalkylol cyanamide or polymerized monoalkylol cyanamide with a primary or secondary aliphatic amine to effect separation of the acidic minerals from the other ore constituents. Particularly this invention relates to the use of the reaction products of monoalkylol cyanamides with aliphatic amines, either as the free base or as the substantially water soluble salt of such a product, as promoters for acidic minerals in froth flotation, film flotation, stratification, agglomeration, tabling and related mineral separation processes. While the invention is not limited to any particular ore concentrating process or to any particular ore, its most important field of usefulness is in connection with the froth flotation processes of separating silica or silicate minerals, such as mica, from non-metallic ores, such as limestone, bauxite, barytes, ilmenite, calcite and the like, and especially phosphate minerals.

The compounds that have been found to have a selective filming attraction for acidic ore materials and which are useful for carrying out this invention include broadly the condensation products of monoalkylol cyanamides or polymerized monoalkylol cyanamide with a primary or secondary aliphatic amine.

The monoalkylol cyanamides are compounds which may be produced by reacting an aqueous slurry of calcium cyanamide, a solution of sodium cyanamide or other alkali or alkaline earth metal salt of cyanamide with one or more mols. of an alkylene oxide, such as ethylene oxide, propylene oxide, etc. For example monoethylol cyanamide may be produced by treating an aqueous slurry of calcium cyanamide at temperatures below 25° C. with a solution of sodium hydroxide. The mixture is then filtered to remove the insolubles and the sodium cyanamide produced remains in the solution. Slightly less than the theoretical quantity of ethylene oxide at a temperature not exceeding 10° C. is then added to the aqueous slurry of the calcium cyanamide while stirring and the cold mixture allowed to stand for about 24 hours. The monoalkylol cyanamide in the mixture is then extracted with portions of chloroform followed by evaporation of the chloroform from the extract under reduced pressure to recover the product.

The monoalkylol cyanamides are polymerizable by heat and accordingly when heated they will form as an intermediate a polymerization product. In this invention, therefore, it is intended that the term monoalkylol cyanamide as used hereinafter in both the specification and the claims shall include both the unpolymerized monoalkylol cyanamide and the dimer thereof when present, unless provision therefor has otherwise been made therein.

The monoalkylol cyanamides described above may be condensed with either a primary aliphatic amine or a secondary aliphatic amine to produce products which have an affinity for and will act as promoters or collectors for acidic ore materials.

A suitable method for producing the condensation products described above comprises heating together a primary or secondary amine with a monoalkylol cyanamide in an acid medium. While the heating of the components may be carried out in any manner found suitable, preferably an acid should be present in order to effect the condensation. Good results have been obtained with acids, such as hydrochloric, sulfuric, acetic, or similar acids which were present either in the free state or in the form which such an acid takes when it has been combined with an organic base to form a salt therewith.

In accordance with the above method suitable condensation products have been prepared by heating together monoethylol cyanamide hydrochloride with butylamine; monoethylol cyanamide acetate with dodecylamine; monoisopropylol cyanamide hydrochloride with dodecylamine and monoisopropylol cyanamide with dodecylamine hydrochloride; monoethylol cyanamide with di-n-propylamine, hydrochloric acid having been added to the incompatible mixture of the components; mono-2,3-dihydroxypropyl cyanamide hydrochloride with a mixed amine containing chiefly hexadecylamine and some octadecylamine; monoethylol cyanamide hydrochloride with aniline and with diphenylamine; monononethoxyethylol cyanamide with isoamyl aniline hydrochloride, and the dimer of monoethylol cyanamide with dodecylamine, acetic acid having been added to the incompatible layers of the components. These products are oily or waxy substances, in part easily soluble in water and in part dispersible therein and which can be made soluble in water by the addition of an acid such as hydrochloric or acetic acid.

The promoter action of the reagents of the present invention will, of course, vary with different ore minerals and with the different monoalkylol cyanamide amine condensation products or salts used. It is an advantage of the invention, however, that good results are obtained when the compounds are used in the form of their water soluble salts, for example, the acetates. However, it is not necessary to use the water soluble salts, and the compound in the form of the free base may be used provided satisfactory dispersion and distribution are effected. In froth flotation operations dispersion may be effectively obtained by feeding an alcoholic solution of the compound into the flotation circuit or by the use of emulsions containing the reagent dispersed therein.

The reagents of the present invention are effective promoters or collecting agents for acidic ore materials generally and said acidic materials may be either worthless gangue or valuable ore constituents. The most important use, however, is in connection with the froth flotation of silica from non-metallic ores in which the siliceous gangue may represent a much smaller proportion of the ore, rather than metallic and sulfide ores in which the gangue usually represents the major proportion of the ore. Representative acidic ore materials are the feldspars, quartz, pyroxenes, the spinels, biotite, muscovite, clays, and the like.

While as stated heretofore the present invention is not limited to the treatment of any particular ore materials, it has been found to be well suited for froth flotation of silica from phosphate rock, and this is a preferred embodiment of the invention. In the processes of removing silica from phosphate rock the conditions are such that practically complete removal of the silica must be accomplished in order to produce a salable phosphate material. It is therefore an advantage of this invention that our reagents not only effect satisfactory removal of the silica but are economical in amounts used. The quantities required range from 0.1 pound to 2.0 pounds per ton of ore depending upon the particular ore and the particular reagent. The invention is not, however, limited to the use of such quantities.

These reagents have also been successfully used for the flotation of feldspar from quartz and for the flotation of mica from quartz and calcite.

The reagents of the present invention may be used alone or in mixtures with other promoters. They may likewise be used in conjunction with other cooperating materials such as conditioning reagents, activators, frothing reagents, depressing reagents, dispersing reagents, oily materials such as hydrocarbon oils, fatty acids or fatty acid esters.

These new reagents are also adaptable for use in any of the ordinary concentrating processes such as film flotation, tabling, and particularly in froth flotation operations. The ore concentrating processes employed will depend upon the particular type or kind of ore which is being processed. For example, in connection with phosphate rock, relatively coarse, phosphate-bearing material, for example 28 mesh or larger, can be economically concentrated by using these reagents in conjunction with other materials such as fuel oil or pine oil and subjecting to concentration by the use of tables or by film flotation. The −28 mesh phosphate rock material is best concentrated by means of froth flotation employing these improved silica promoters.

When the reagents of the present invention are employed as promoters in the froth flotation of silica from phosphate rock, the conditions may be varied in accordance with procedures known to those skilled in the art. The reagent may be employed in the form of aqueous solutions, emulsions, mixtures, or solutions in organic solvents such as alcohol and the like. The reagents may be introduced into the ore pulp in the flotation cell without prior conditioning or they may be conditioned with the ore pulp prior to the actual concentration operation. They may also be stage fed into the flotation circuit.

Other improved phosphate flotation features which are known may be utilized in connection with the present invention such as the very complete removal of the slimes prior to flotation which is an aid to better results as pointed out in the Erickson application, Serial No. 325,011, filed March 20, 1940, and the Mead and Maust application, Serial No. 320,121, filed February 21, 1940, which describes a process for classifying and desliming phosphate flotation feed by means of a hindered settling classifier and which deslimed feed is well suited for treatment in accordance with this invention.

The invention will be further illustrated by the following specific examples which are illustrations of the preferred embodiments thereof, but it is not intended to limit the invention thereby.

*Example 1*

Flotation tests as follows were made on a sample of Florida phosphate ore from the Old Colony mine near Brewster. This ore material which was essentially −48 +200 mesh material was agitated and "scrubbed" with water to break up the clay balls. The slimes were subsequently removed by decantation and repeated washing until the ore material was substantially free of slimes.

Separate 600 gram samples of deslimed flotation feed were diluted to 22% solids with water and transferred to a laboratory size Fagergren flotation machine. The particular reagent or reagent combination was then added and conditioned with the pulp for 3 seconds. Air was admitted to the machine and the resultant concentrate was skimmed off for 2 minutes. The flotation test products were then filtered, dried, weighed, and assayed. The metallurgical data obtained in these tests are presented in Table I.

*Table I*

| Test No. | Feed, percent insoluble | Concentrate | | | Tailing | | | Reagents | Lbs./ton of feed |
|---|---|---|---|---|---|---|---|---|---|
| | | Percent water | Percent insoluble | Dist. percent insoluble | Percent water | Percent insoluble | Dist. percent insoluble | | |
| 1 | 55.92 | 55.94 | 93.42 | 93.46 | 44.06 | 8.28 | 6.54 | Condensation product of ethanolcyanamide and dodecylamine acetate | 0.25 |
| | | | | | | | | Pine oil | 0.12 |
| 2 | 56.23 | 57.66 | 92.80 | 95.17 | 42.34 | 6.40 | 4.83 | Condensation product of ethanolcyanamide and dodecylamine acetate | 0.50 |
| | | | | | | | | Pine oil | 0.12 |
| 3 | 56.00 | 54.03 | 95.14 | 91.80 | 45.97 | 9.98 | 8.20 | Condensation product of polymerized ethanolcyanamide and dodecylamine acetate | 0.50 |
| | | | | | | | | Pine oil | 0.12 |

While the above examples relate specifically to the flotation of silica from phosphate rock, the present invention is not limited to such operations and the reagents are useful in the treatment of various other types of ore materials wherein it is desirable to remove acidic minerals in the froth. For example, the reagents are useful in the treatment of the coarse portion of the tailings produced in cement plant flotation operations. In this particular instance the rake sands are treated by flotation to remove part of the alumina which is present in the form of mica and the removal of silica is not desirable. Our reagents have been found to be useful in such flotation operations. The reagents may also be used for the flotation of silica from iron ores containing magnetite, limonite and quartz, and in tests conducted on this type of ore the rough tailing resulting from the flotation of silica containing both magnetite and limonite, assayed much higher in iron than concentrates produced by the conventional soap flotation of the iron minerals.

What I claim is:

1. In a process of separating acidic ore materials from non-metallic ore constituents the step comprising subjecting the ore in an aqueous pulp to a concentrating operation in the presence of a reagent selected from the class consisting of the condensation products of aliphatic primary amines with the reaction product of an alkylene oxide and a substance of the group consisting of alkali metal and alkaline earth metal salts of cyanamide, and salts of such products.

2. In a process of separating acidic siliceous gangue from phosphate ore values the step comprising subjecting the ore in an aqueous pulp to a concentrating operation in the presence of a reagent selected from the class consisting of the condensation products of aliphatic primary amines with the reaction product of an alkylene oxide and a substance of the group consisting of alkali metal and alkaline earth metal salts of cyanamide, and salts of such products.

3. In the froth flotation process of separating non-metallic ore values from acidic siliceous gangue the step which comprises subjecting the ore to a froth flotation in the presence of a reagent chosen from the group consisting of the condensation products of aliphatic primary amines with the reaction product of an alkylene oxide and a substance of the group consisting of alkali metal and alkaline earth metal salts of cyanamide, and salts of such products.

4. In the froth flotation process of separating phosphate ore values from acidic siliceous gangue the step which comprises subjecting the ore to a froth flotation in the presence of a reagent chosen from the group consisting of the condensation products of aliphatic primary amines with the reaction product of an alkylene oxide and a substance of the group consisting of alkali metal and alkaline earth metal salts of cyanamide, and salts of such products.

5. In the froth flotation process of separating phosphate ore values from acidic siliceous gangue the step which comprises subjecting the ore to froth flotation in the presence of a promoter comprising the condensation product of an aliphatic primary amine having at least eight carbon atoms with the reaction product of ethylene oxide and calcium cyanamide.

6. In the froth flotation process of separating phosphate ore values from acidic siliceous gangue the step which comprises subjecting the ore to froth flotation in the presence of a promoter comprising the condensation product of dodecylamine with the reaction product of ethylene oxide and calcium cyanamide.

7. In a process of separating acidic ore materials from non-metallic ore constituents the step comprising subjecting the ore in an aqueous pulp to a concentrating operation in the presence of a reagent selected from the class consisting of the condensation products of aliphatic primary amines with the reaction product of an alkylene oxide and a substance of the group consisting of alkali metal and alkaline earth metal salts of cyanamide, the condensation products of aliphatic secondary amines with the reaction product of an alkylene oxide and a substance of the group consisting of alkali metal and alkaline earth metal salts of cyanamide, and salts of such products.

STEPHEN EDWARD ERICKSON.